Oct. 29, 1963 G. M. BARCLAY 3,108,983
SYNTHETIC RUBBER
Filed April 15, 1960
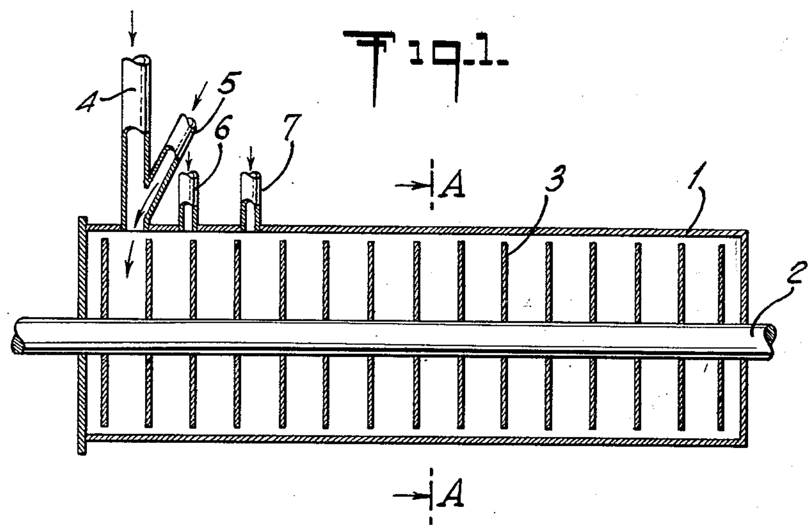
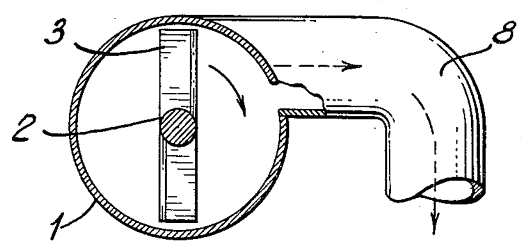
INVENTOR.
GERALD M. BARCLAY
BY Walter H. Schneider
ATTORNEY United States Patent Office 3,108,983

Patented Oct. 29, 1963

3,108,983

SYNTHETIC RUBBER

Gerald M. Barclay, Baytown, Tex., assignor, by mesne assignments, to Ashland Oil & Refining Company, Ashland, Ky., a corporation of Kentucky Filed Apr. 15, 1960, Ser. No. 22,461
10 Claims. (Cl. 260—33.6)

This invention relates to synthetic rubber latices. More particularly, it relates to the processing of synthetic rubber latices and the products obtained thereby. Still more particularly, it relates to an improved process of coagulating synthetic rubber latices.

Synthetic rubber latices are prepared, in general, by the emulsion polymerization of a butadiene-1,3 or mixtures thereof, or by the polymerization of a butadiene-1,3 with other compounds polymerizable therewith. Polymerization is conducted in an aqueous medium using any of various polymerization recipes. The reaction is short-stopped at the desired point, after which the resultant latex is normally coagulated with salt and/or acid. The coagulated polymer is then subjected to washing, filtering and drying operations.

It is known that synthetic latices can be coagulated using an acid alone in the absence of a salt. It is possible, for instance, to coagulate a synthetic latex by adding an acid thereto and agitating in a conventional coagulating tank. By such a procedure, however, it is difficult to control the tack and particle size of the resultant polymer so as to render it easily amenable to further treatment in conventional finishing equipment. Particularly is this true when treating latices, per se, and carbon black latex masterbatches prepared from aqueous carbon black slurries in which a dispersing agent has been employed to disperse the black.

In order to obtain a coagulum in the form of small particles, it has been proposed to contact a latex with any of various coagulating agents or mixtures thereof in such a manner as to effect a turbulent mixing. It has been suggested, for example, that such a turbulent mixing action be produced as by discharging streams of latex and coagulating agents through separate orifices so as to impinge upon each other. Such a procedure, however, has certain disadvantages. For instance, it is subject to variations in pressure as well as clogging of the nozzles. In addition, the treatment of high gravity products such as black-latex masterbatches creates problems. Still further, such a process has no positive means for controlling particle size of the coagulum.

Accordingly, it has proved desirable to coagulate latices using both salt and acid since the presence of salt appears to provide the necessary control of tack and particle size. Usually, the salt and acid are employed in a two step procedure, the salt being added first, although in the treatment of black-latex masterbatches, a mixture of salt and acid is generally used. In either event, however, the advantages gained by the use of salt are at least in part offset by certain disadvantages. For instance, it has been shown that residual salt in the coagulum has an adverse effect on the heat stability during subsequent treatment thereof. The high water soluble ash content of the final product, moreover, seriously affects its quality for certain uses. Although the use of coagulating systems comprising materials other than salt and acid have been suggested, for example alum and glue-acid, the introduction into the polymer of such quantity affecting impurities is also a disadvantage thereof.

There has remained, therefore, a continued demand for an improved process of coagulating synthetic latices not subject to the above disadvantages. Such a process should be capable of producing a polymer of easily controlled tack and particle size to permit ready processing thereof in conventional finishing equipment. At the same time, it should avoid the use of salt or a substitute therefor so as to eliminate the disadvantages inherent in such use. Such a process, moreover, should be subject to continuous operation at a high and efficient rate. In addition, the process should require no unusual or costly equipment, should be simply installable in a conventional synthetic rubber plant and should be readily practiced with no more than the normal amount of supervisory control usually exhibited in such plants.

It is a principal object of this invention to fulfill this demand. It is a further object of this invention to provide an improved process for coagulating synthetic latices. It is a still further object of this invention to provide a process for coagulating synthetic rubber latices in the substantial absence of salt but which process, at the same time, exhibits the advantages attributable to the use of salt. An additional object is to obtain a coagulum of a predetermined average particle size. A further object of this invention is to produce products having exceptionally low water soluble ash contents, particularly white rubber and dispersing agent-black masterbatch products.

According to this invention, these objects are easily and fully met by a simple yet effective process. In view of previous experience in the use of salt-free coagulating systems in the coagulation of synthetic latices, the results obtained by the instant process are completely surprising and unexpected. In general, the process of this invention involves the coagulation of synthetic latices using a coagulating system in which acid alone is present. It comprises bringing together a latex and an acid coagulating system and subjecting the resultant mixture to concurrent agitating and comminuting actions. On completion of the above treatment, the resultant coagulum is separated, and further processed in conventional equipment.

Although the process of this invention is particularly concerned with the coagulation of latices obtained by the emulsion polymerization of butadiene-1,3 with styrene using a soap-type emulsifier such as a rosin acid or fatty acid soap, nevertheless, it is just as applicable to the coagulation of other synthetic latices similarly produced. By the latter is meant those latices formed by the emulsion polymerization of a butadiene-1,3 such as butadiene-1,3, methyl-2-butadiene-1,3, chloro-2-butadiene-1,3, piperylene-2,3-dimethyl butadiene-1,3 and the like as well as mixtures thereof. Also intended to be included are those latices formed by the emulsion polymerization of butadiene-1,3 with one or more compounds of polymerizable therewith containing a temrinal $CH_2=C<$ group. Examples of such compounds are aryl olefins including styrene mentioned above such as α-methylstyrene, p-chlorostyrene and the like; and the α-methylene carboxylic acids, their esters and nitriles such as acrylic acid, methyl acrylate, methyl methacrylate, acrylonitrile, methacrylonitrile, methyl vinyl ether, methyl vinyl ketone and the like.

The process may be practiced on latex, per se, or latex masterbatched with extender oil and/or carbon black. The particular types of oils and blacks employed in masterbatching and their methods of manufacture form no part of this invention. Suffice it to say that the oils and blacks employed are those normally employed in the art. The black-latex masterbatch may be one in which the aqueous carbon black slurry employed in the preparation of the masterbatch may have been prepared by either chemical or mechanical dispersion of the black in water. Similarly, the process may be practiced on a black-latex masterbatch in which the carbon black has been added directly to the latex is substantially dry form. As used herein and throughout the claims, the term "latex" is intended to include any of the above.

The particular means, hereafter referred to as a coagulating device, employed for obtaining the concurrent agitating and comminuting actions in accordance with this invention may be widely varied so long as it is capable of providing a controlled action suitable for the treatment of the particular latex under consideration. For the purpose of further description of the process of this invention, however, reference will be made to the attached drawing showing one form of coagulating device. While this has proved to be particularly effective in the practice of the process of this invention, it should be understood that it is illustrative only and that modifications thereof, as well as other and different types of coagulating devices, may be employed.

In the drawing, FIGURE 1 is a longitudinal sectional view of a coagulating device, while FIGURE 2 is an end view taken on the line A—A of FIGURE 1.

As shown in the drawing, the coagulating device comprises an elongated tubular member 1, the dimensions of which may be widely varied. Extending through tubular member 1 along its longitudinal axis is rotor 2 carrying a plurality of sets of radially extending blades 3. The number of blades per set as well as the number of blade sets, may both be varied but should be in such relation to the dimensions of tubular member 1 as to provide the agitating and comminuting actions necessary to the process of this invention. As shown in FIGURE 2, the illustrative device has two blades per set 180° removed from each other. The blade sets may be fixed to rotor 2 so as to provide a double helix running the length of member 1, or they may be all carried in a similar position. Each blade, if desired, may be pitched to provide a pumping action, although the external pressure applied to the latex entering the device is normally adequate to provide the necessary flow therethrough. Provided at the entrance end of member 1 is a port 4 for introducing latex, while ports 5, 6 and 7, variously located as shown, may be employed for the introduction of coagulating acid. Alternatively, the entire acid content may be added through, if desired, any one or two of ports 5, 6 and 7 while water may be introduced through the third port to control coagulating pH if necessary. The device may also have associated therewith means for introducing steam for maintaining proper coagulating temperature. At the opposite or discharge end of member 1 is a conduit 8 for discharging coagulum for further treatment. Associated with shaft 2, but not shown, is variable speed drive means for controlling rotor speed.

It will be apparent to those skilled in the art that any of various modifications of the illustrated device may be readily arrived at in which may be carried out the steps of the present process. For example, the latex entry port may be tangentially or otherwise situated rather than centered as shown while the discharge conduit may provide for discharge flow other than lateral, such as a downward flow. Similarly, the shape of the entry and discharge means may take various forms as, for instance, a large box type entry port rather than a restricted conduit as shown. The number of acid ports may be varied and their positions altered as by being spaced along the length of the device while the shape of the blades may take different forms. Not only may the illustrated device be readily modified, it is also apparent that different types of devices may be employed and will readily occur to those skilled in the art.

The operation of the illustrated coagulating device in the practice of the process of this invention is believed apparent. Latex is introduced through port 4 while a simultaneous addition of a dilute acid solution, along with water and steam, if necessary, is made through ports 5, 6 and 7. As the latex and acid come together at a predetermined temperature, the resultant mixture, substantially simultaneous with its formation is subjected to the violent agitation and comminution actions of the blades rotating at a predetermined speed. Conversion of the soap quickly occurs and the wet crumb or coagulum is discharged through port 8 to be subjected to conventional filtering, washing and drying operations.

Why the concurrent agitating and comminuting actions according to the present process result in such an unusually effective coagulation in the absence of salt is not clearly understood, nor is there any desire to limit the invention by any particular theory of operation. It is clearly evident, however, that the results previously attributed to the presence of a salt-acid coagulating system are herein attained by the use of acid alone. It may be that the turbulent flow created by the violent agitation taken together with the concurrent comminuting action brings an unusually large surface area of latex particles into instant contact with the acid with resultant quick conversion of the soap and formation of a wet crumb or coagulum substantially free of fines. At any rate, whatever the explanation, the agitating and comminuting actions as practiced in the instant process completely eliminate the use of salt heretofore deemed necessary for latex coagulation.

Not only is the process advantageous from the standpoint of forming a readily processable coagulum free of fines in the absence of salt but, by controlling the intensity of turbulence and comminution, the coagulum may be readily produced as particles of a predetermined average particle size. This control is exercised through variations in the intensity of the agitating and comminuting actions. In general, it can be stated that the softer and stickier the coagulum normally is, the more intense the agitating and comminuting actions must be to obtain the desired particle size. Pigmented latices, i.e., carbon black and the like masterbatches, therefore, generally require less intense agitating and comminuting actions than do non-pigmented latices. Insufficiently intense or excessively intense actions in any particular case may be expected to lead to soft chunky coagulum and coagulum comprising considerable amounts of fines, respectively. The intensity of actions required for the treatment of any particular latex is not an easily definable measurement. It depends on the means employed to obtain the agitating and comminuting actions and the length of time the latex is subjected to such actions in the particular means. For any particular coagulating device, however, the intensity and length of time of the agitating and comminuting actions necessary to obtain the desired results may be readily determined.

The acid employed for coagulation may be any organic or mineral acid normally employed for this purpose in amounts and concentrations well known to those skilled in the art. The pH during coagulation is similar to that maintained in a normal salt-acid coagulation although the coagulating process of this invention appears to be somewhat more sensitive to pH. In general, a pH of about 2.5–3.0 is maintained during coagulation. Coagulation temperature will vary with the particular latex being treated. In general, it may be stated that for non-pigmented latices, the desired results are more readily obtained at higher temperatures than is necessary for pigmented latices. For the latter, temperatures within the vicinity of that at which they normally approach the coagulating step, i.e., about 95–125° F., have proved to be quite satisfactory. For non-pigmented latices, it has been found preferable to raise the coagulating temperature to about 140–165° F. This may readily be done by injecting steam into the coagulating device or by otherwise heating the latex and/or acid.

Although the process of this invention shows particular advantage in the treatment of latices, per se, as well as oil-extended latices and black-latex masterbatches which have been prepared from aqueous black slurries containing chemical dispersing agent, it also demonstrates advantage in the treatment of black-latex mastermatches prepared without the use of dispersing agents. In the latter case, where salt is not normally required in the coagulating system in any event, the present process forms a coagulum of a more uniform particle size. In the former case, however, in addition to forming a coagulum of more uniform particle size, it permits substantial elimination of the use of salt and all the attendant disadvantages thereof. Significant in this respect are the improved heat stability of the coagulum gained by substantial elimination of salt and, particularly, the low water soluble ash content of the final product. Heretofore, the production of a synthetic rubber having a water soluble ash content below about 0.5% using a salt-acid coagulating system was difficult if not impossible to obtain. Usually, it was attained by substituting a glue-acid coagulating system for the salt-acid system. This, however, while reducing the ash, involves the substitution of one impurity for another. By the present process, no foreign substances are introduced into the product, yet the ash content may be maintained well below 0.5%.

The process of this invention is further described in the following examples. These examples are illustrative only and not by way of limitation. Unless otherwise noted, all parts are by weight. The coagulating device employed in the examples for carrying out the process of this invention is similar to that illustrated in the drawing. It comprises a cylindrical shell having a length of 2 ft. and an inside diameter of 7 in. A variable speed rotor extends along the axis of the shell carrying 11 sets of unpitched blades equidistantly spaced from each other. The shell is provided with inlet ports for latex, acid solution, water and steam and a discharge port for discharging coagulum to filtering, washing and drying apparatus.

EXAMPLE 1

According to conventional salt-acid coagulation procedure, there is added to a stream of latex of synthetic rubber (SBR–1500 having 23.5% bound styrene) at 105° F. and containing 19.2% solids, a 9% aqueous sodium chloride solution to cream the latex. To this is then added a 0.63% aqueous sulfuric acid solution, and the resultant mixture is fed to a coagulation tank. The latex, acid and brine are fed at rates of 2.0, 1.5 and 4.0 gal./min. Coagulation is conducted at a pH of 3.0 and hold up time in the coagulation tank is about 2 minutes. The resultant suspension flows from the coagulation tank to a soap conversion tank where it is held for about 10 minutes to complete conversion of the soap. The suspension is then filtered and washed. Wet crumb, having a particle size of ¼–⅜" and containing some fines, is dried for one hour at 180° F. The partially dried crumb is then disintegrated. Drying is completed at 160° F. The water soluble ash content of the white rubber is 0.93% by weight.

EXAMPLE 2

The procedure of Example 1 is repeated except that no brine is employed and the latex and acid are directed into a coagulating device as described. Temperature is maintained at 145° F. by the addition of steam and rotor speed maintained at 1750 r.p.m. Residence time in the device is 30 seconds. Wet crumb, having a particle size of about ⅜" and free of fines, is further treated as in Example 1. Water soluble ash content of the white rubber is 0.25% by weight.

EXAMPLE 3

The products of Examples 1 and 2 are made into compositions according to the following recipe.

| Constituent: | Parts |
|---|---|
| Polymer | 100 |
| HAF black | 50 |
| Zinc oxide | 3 |
| Stearic acid | 0.5 |
| Sulfur | 1.75 |
| N-cyclohexylbenzothiazole-2-sulfenamide | 0.7 |
| Diphenylguanidine | 0.5 |

Samples of the two compositions are then cured at 292° F. for periods of 15, 30, 45 and 60 minutes and tested for modulus, tensile and elongation. Results appear in Table I.

*Table I*

| Time | Example 1 | | | Example 2 | | |
|---|---|---|---|---|---|---|
| | Modulus at 300% (p.s.i.) | Tensile (p.s.i.) | Elongation Percent | Modulus at 300% (p.s.i.) | Tensile (p.s.i.) | Elongation Percent |
| 15 | 970 | 2,250 | 620 | 1,030 | 2,540 | 670 |
| 30 | 2,120 | 3,700 | 500 | 2,130 | 3,830 | 510 |
| 45 | 2,390 | 3,840 | 470 | 2,460 | 3,860 | 470 |
| 60 | 2,530 | 3,780 | 430 | 2,470 | 3,860 | 460 |

The data of Table I show that the low water soluble ash product prepared according to the process of this invention (Example 2) has comparable compounding characteristics to the product prepared by the conventional salt-acid process (Example 1) without being subject to the inherent disadvantages of the latter.

EXAMPLE 4

The procedure of Example 1 is repeated except that a latex-carbon black mixture is coagulated. The latex is SBR–1502 having 23.5% bound styrene and containing 21.9% solids. The carbon black is an HAF type black made into a 15% aqueous slurry using 1.2% on the weight of the black of Marasperse CB (a partially desulfonated sodium lignosulfonate) as a dispersing agent. Latex and carbon black slurry are fed together at rates of 2.4 and 1.5 gal./min., respectively, to give an ultimate product comprising 100 parts polymer and 50 parts carbon black. The resultant slurry is passed through a homogenizing zone and to it is then added a 9% aqueous solution of sodium chloride followed by a 0.5% aqueous sulfuric acid solution. The ratio of black-latex masterbatch, brine and acid are 3.9, 2.2 and 1.4 gal./min., respectively. Wet crumb having a particle size of about ⅜" is soft and distintegrates to some extent in the conversion tank. The wet crumb is further processed as in Example 1. Water soluble ash content of the resultant masterbatch product is 0.97% by weight.

EXAMPLE 5

The procedure of Example 2 is repeated using the black-latex masterbatch, acid and rates of addition of Example 4. Rotor speed of the coagulating device is 650 r.p.m. and coagulating temperature 110°–115° F. Residence time is 40 seconds. A web crumb having a uniform particle size of about ½" with substantially no fines is treated as in Example 2 except that drying is conducted in an air oven at 180° F. for four hours. Water soluble ash content of the resultant masterbatch product is 0.25% by weight.

EXAMPLE 6

The products of Examples 4 and 5 are made into compositions according to the following recipe.

| Constituent: | Parts |
|---|---|
| Black masterbatch | 150 |
| Sulfur | 2.0 |
| Zinc oxide | 1.5 |
| Benzothiazyldisulfide | 1.5 |

Samples of the two compositions are then cured at 292° F. for periods of 15, 30, 45 and 100 minutes. Results appear in Table II.

*Table II*

| Time | Example 4 | | | Example 5 | | |
|---|---|---|---|---|---|---|
| | Modulus at 300% (p.s.i.) | Tensile (p.s.i.) | Elongation Percent | Modulus at 300& (p.s.i.) | Tensile (p.s.i.) | Elongation Percent |
| 15 | 1,340 | 2,680 | 590 | 1,350 | 2,880 | 610 |
| 30 | 1,820 | 3,130 | 510 | 2,080 | 3,380 | 450 |
| 45 | 2,010 | 3,280 | 460 | 2,320 | 3,480 | 470 |
| 100 | 2,600 | 3,280 | 380 | 2,520 | 3,510 | 420 |

As in Table I, the above data show the low soluble ash black masterbatch product prepared according to the process of this invention (Example 5) to have processing characteristics comparing favorably with those of the masterbatch product formed by the conventional salt-acid method (Example 4) without being subject to the inherent disadvantages of the latter.

EXAMPLE 7

To demonstrate how particle size can be controlled according to the present invention, the procedure of Example 5 is repeated increasing the rotor speed to 1000 r.p.m. The wet crumb thus obtained contains considerable fines and proves difficult to further process.

EXAMPLE 8

In the preparation of an oil-extended black masterbatch having a composition comprising 100 parts polymer, 75 parts carbon black, 37.5 parts oil according to the process of this invention, there is employed an SBR latex of a high Mooney type synthetic rubber (4ML–110), a conventional aromatic extender oil as a 50% aqueous dispersion and a 15% aqueous suspension of HAF black prepared as in Example 4. Flow ratios of latex, oil dispersion and black dispersion are 2.4, 0.375 and 2.25 gal./min. respectively. The resultant mixture is passed through a homogenizing zone and then to the coagulating device where 0.5% aqueous sulfuric acid is added at the rate of 1.2 gal./min. Rotor speed is 600 r.p.m. and coagulating temperature maintained at 100–110° F. Coagulating pH is approximately 3.0. Residence time is approximately 40 seconds. A wet crumb is obtained having a particle size of ⅜" and containing few fines. On further processing, a low water soluble ash product is obtained.

EXAMPLE 9

The procedure of Example 2 is again repeated replacing the butadiene-styrene latex with a polybutadiene latex of 20% solids using similar rates of latex and acid, rotor speed and residence time. Temperature was maintained at 145° F. and rotor speed at 1750 r.p.m. A coagulum of uniform particle size is obtained which, on filtering, washing and drying, gives a product of low water soluble ash content.

EXAMPLE 10

The procedure of Example 2 is repeated replacing the butadiene-styrene latex with butadiene-acrylonitrile, butadiene-methyl acrylate and butadiene-ethyl acrylate. In each instance, coagula are obtained of uniform particle size substantially free of fines which, on further treatment, give white rubbers of low water soluble ash content.

As mentioned in the description of the process and device, the coagulating acid may be added in a plurality of increments. These may be as high as five, but addition in three or four increments has proved to be preferable when conducting the process in this manner. As the acid additions are made, of course, the agitating and comminuting actions are continued. The following example illustrates this manner of conducting the process.

EXAMPLE 11

The procedure of Example 2 is repeated except that the acid is added in three increments. The first addition is made as the latex enters the coagulating device and is sufficient to lower the pH to about 7.3. Two subsequent additions are made to reduce the pH to about 6.0 and 3.0, respectively. The discharged particulate coagulum is uniform in particle size and substantially free of fines. On filtering, washing and drying, a white rubber is obtained having a low water soluble ash content similar to that of Example 2.

I claim:

1. A process for preparing a substantially ash-free synthetic rubber from an emulsion of synthetic rubber latex prepared by the emulsion polymerization of a member selected from the group consisting of a conjugated diolefin and a conjugated diolefin together with at least one additional monomer polymerizable therewith, said polymerization being conducted in the presence of at least one emulsifier selected from the group consisting of rosin acid soaps and fatty acid soaps, which comprises: introducing said emulsion of synthetic rubber latex into an elongated, confined zone at one end thereof; introducing into said confined zone at the same end thereof an aqueous solution of an acid capable of coagulating said latex; flowing the resultant mixture of said latex emulsion and said aqueous acid solution toward the opposite end of said confined zone; subjecting said flowing mixture to mechanical agitation; concurrently subjecting the mixture to mechanical comminution to comminute coagulum as it is formed, the intensities of agitation and comminution being controlled with respect to the retention time within said confined zone to expose substantially all of the latex to said acid whereby conversion of the emulsifier is quickly and substantially completely obtained and a coagulum comprising particles of a substantially uniform predetermined particle size and having a low fines content is produced; the pH within the zone being maintained at 2.5–3.0 and the temperature at 140–165° F. for an unpigmented latex and at 95–125° F. for a masterbatch; discharging the resultant coagulum-bearing mixture from said confined zone and recovering a synthetic rubber therefrom having a water soluble ash content of less than about 0.5%.

2. A process according to claim 1 in which the emulsion of synthetic rubber latex is in the form of unpigmented latex.

3. A process according to claim 1 in which the synthetic rubber latex is in the form of a carbon black-latex masterbatch.

4. A process according to claim 1 in which the synthetic rubber latex is in the form of an oil-extended carbon black-latex masterbatch.

5. A process according to claim 1 in which the acid is introduced into said confined zone as a plurality of increments at separate points.

6. A process according to claim 1 in which the emulsion of synthetic rubber-like latex is an emulsion of a styrene-butadiene polymer and the emulsion is in the form of unpigmented latex.

7. A process according to claim 1 in which the emulsion of synthetic rubber-like latex is an emulsion of a styrene-butadiene polymer and the emulsion is in the form of carbon black-latex masterbatch.

8. A process according to claim 7 in which the masterbatch is a homogenized masterbatch containing a dispersing agent.

9. A process according to claim 7 in which the carbon black-latex masterbatch contains an extender oil.

10. A process for preparing a substantially ash-free synthetic rubber from an emulsion of synthetic rubber latex prepared by the emulsion polymerization of a member selected from the group consisting of a conjugated diolefin and a conjugated diolefin together with a least one additional monomer polymerizable therewith, said polymerization being conducted in the presence of at least one emulsifier selected from the group consisting of rosin acid soaps and fatty acid soaps, which comprises: introducing said emulsion of synthetic rubber latex and an acid capable of coagulating it into an elongated, confined zone; causing the latex and acid to flow within said zone towards an end thereof; subjecting the flowing mixture to mechanical agitation; concurrently subjecting the mixture to mechanical comminution to comminute coagulum as it is formed, the intensities of agitation and comminution being controlled with respect to the retention time within said confined zone to expose substantially all of the latex to said acid, whereby conversion of the emulsifier is quickly and substantially completely obtained and a coagulum comprising particles of a substantially uniform predetermined particle size and having a low fines content is produced; the pH within the zone being maintained at 2.5–3.0 and the temperature at 140–165° F. for an unpigmented latex and at 95–125° F. for a masterbatch; discharging the resultant coagulum-bearing mixture from said confined zone and recovering a synthetic rubber therefrom having a water soluble ash content of less than about 0.5%.

References Cited in the file of this patent

UNITED STATES PATENTS

| | | |
|---|---|---|
| 2,300,176 | Raynolds | Oct. 27, 1942 |
| 2,366,460 | Semon | Jan. 2, 1945 |
| 2,408,128 | Squires et al. | Sept. 24, 1946 |
| 2,495,147 | Street | Jan. 17, 1950 |
| 2,769,795 | Braendle | Nov. 6, 1956 |
| 2,840,356 | Wills | June 24, 1958 |
| 2,915,489 | White | Dec. 1, 1959 |
| 2,955,096 | White | Oct. 4, 1960 |
| 2,955,097 | White | Oct. 4, 1960 |
| 2,972,473 | Heller | Feb. 21, 1961 |
| 3,046,263 | Whitlock | July 24, 1962 |
| 3,048,559 | Heller et al. | Aug. 7, 1962 |

OTHER REFERENCES

Steiner: Abstract of application No. 781,456, published March 18, 1952, 656 O.G. 890–891.